United States Patent
Pfeiffer et al.

(10) Patent No.: US 12,325,254 B2
(45) Date of Patent: Jun. 10, 2025

(54) OPTICALLY VARIABLE SECURITY ELEMENT

(71) Applicant: GIESECKE+DEVRIENT CURRENCY TECHNOLOGY GMBH, Munich (DE)

(72) Inventors: Matthias Pfeiffer, Munich (DE); Tobias Sattler, Holzkirchen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/014,559

(22) PCT Filed: Jul. 2, 2021

(86) PCT No.: PCT/EP2021/025243
§ 371 (c)(1),
(2) Date: Jan. 5, 2023

(87) PCT Pub. No.: WO2022/008098
PCT Pub. Date: Jan. 13, 2022

(65) Prior Publication Data
US 2023/0249488 A1   Aug. 10, 2023

(30) Foreign Application Priority Data
Jul. 7, 2020   (DE) .................. 10 2020 004 091.8

(51) Int. Cl.
*B42D 25/328* (2014.01)
*B42D 25/305* (2014.01)
(Continued)

(52) U.S. Cl.
CPC ......... *B42D 25/328* (2014.10); *B42D 25/305* (2014.10); *B42D 25/324* (2014.10);
(Continued)

(58) Field of Classification Search
CPC .. B42D 25/351; B42D 25/324; B42D 25/328; B42D 25/305; B42D 25/369; B42D 25/373; B42D 25/382
(Continued)

(56) References Cited

U.S. PATENT DOCUMENTS

| 6,060,143 | A | 5/2000 | Tompkin et al. |
| 8,449,969 | B2 | 5/2013 | Keller et al. |

(Continued)

FOREIGN PATENT DOCUMENTS

| AU | 2008243443 B2 | 10/2011 |
| DE | 69636991 T2 | 12/2007 |

(Continued)

OTHER PUBLICATIONS

German Search Report from corresponding German Patent Application No. 10 2020 004 091.8, Feb. 24, 2021.
(Continued)

*Primary Examiner* — Justin V Lewis
(74) *Attorney, Agent, or Firm* — Workman Nydegger (57) ABSTRACT

An optically variable security element is provided for securing valuable articles, whose areal expanse defines a z-axis perpendicular thereto, having a reflective areal region that displays at least two appearances that are perceptible from different viewing directions. The reflective areal region includes two relief structures arranged at different height levels in the z-direction and form a lower-lying and a higher-lying relief structure, each of which is furnished with a reflection-increasing coating that follows the course of the relief. The higher-lying relief structure displays a first optically variable effect in a first color, and the lower-lying relief structure is visible through the higher-lying reflection-increasing coating itself, or through grid spaces or gaps in the higher-lying reflection-increasing coating and displays a
(Continued)

second optically variable effect in a second, different color. The security element is furnished in an interior layer provided contiguously or in some regions, with at least one machine-readable feature substance.

20 Claims, 8 Drawing Sheets

(51) Int. Cl.
*B42D 25/324* (2014.01)
*B42D 25/351* (2014.01)
*B42D 25/369* (2014.01)
*B42D 25/373* (2014.01)
*B42D 25/382* (2014.01)

(52) U.S. Cl.
CPC ......... *B42D 25/351* (2014.10); *B42D 25/369* (2014.10); *B42D 25/373* (2014.10); *B42D 25/382* (2014.10)

(58) Field of Classification Search
USPC ................................ 283/74, 91, 94, 98, 901
See application file for complete search history.

(56) References Cited

U.S. PATENT DOCUMENTS

| | | |
|---|---|---|
| 2005/0104364 A1 | 5/2005 | Keller et al. |
| 2015/0352887 A1 | 12/2015 | Holmes |
| 2021/0268825 A1 | 9/2021 | Scherer et al. |
| 2021/0283939 A1* | 9/2021 | Scherer ................ B42D 25/351 |

FOREIGN PATENT DOCUMENTS

| | | |
|---|---|---|
| DE | 102007019522 A1 | 10/2008 |
| DE | 102010022123 A1 | 11/2011 |
| DE | 102018005447 A1 | 1/2020 |
| WO | 03053713 A1 | 7/2003 |
| WO | 2007060133 A1 | 5/2007 |
| WO | 2020011390 A1 | 1/2020 |
| WO | WO-2020011391 A1 * | 1/2020 ............ B42D 25/29 |

OTHER PUBLICATIONS

International Search Report from corresponding PCT Application No. PCT/EP2021/025243, Oct. 15, 2021.

* cited by examiner

OPTICALLY VARIABLE SECURITY ELEMENT

BACKGROUND

The present invention relates to an optically variable security element for securing valuable articles, whose areal expanse defines a z-axis perpendicular thereto, having a reflective areal region that displays at least two appearances that are perceptible from different viewing directions.

For protection, data carriers, such as value or identification documents, but also other valuable objects, such as branded articles, are often furnished with security elements that permit the authenticity of the data carriers to be verified and that simultaneously serve as protection against unauthorized reproduction. The security elements can be formed, for example, in the form of a security thread embedded in a banknote, a cover foil for a banknote having a hole, an applied security strip, a self-supporting transfer element, or also in the form of a feature region imprinted directly on a value document.

Security elements having a viewing-angle-dependent or three-dimensional appearance play a special role in safeguarding authenticity, as said security elements cannot be reproduced even with state-of-the-art copiers. For this, the security elements are furnished with optically variable elements that, from different viewing angles, convey to the viewer a different image impression and for example display a different color or brightness impression and/or a different graphic motif depending on the viewing angle. Here, as optically variable effects, for example movement effects, pump effects, depth effects and flip effects that are realized with the aid of holograms, microlenses or micromirrors are described in the background art.

Some time ago, optically variable security elements that comprise two relief structures arranged at different height levels and furnished in each case with a color coating were suggested (see WO 2020/011390 A1, WO 2020/011391 A1 and WO 2020/011391 A2). Here, the color coating of the higher-lying relief structure is either structured as a grid or furnished with gaps such that, when the security element is viewed, the color coating of the lower-lying relief structure appears in the grid spaces or gaps.

SUMMARY

Proceeding from this, the object of the present invention is to specify a generic optically variable security element having increased counterfeit security.

To solve the said object, the present invention includes an optically variable security element having a reflective areal region that can be used especially for securing valuable articles. The reflective areal region displays at least two appearances that are perceptible from different viewing directions. Here, the areal expanse of the security element defines a plane and a z-axis perpendicular to the area.

The said reflective areal region includes two relief structures that are arranged at different height levels in the z-direction and form a lower-lying and a higher-lying relief structure, each of which is furnished with a reflection-increasing coating that follows the course of the relief.

The higher-lying relief structure displays a first optically variable effect in a first color. The lower-lying relief structure is visible through the higher-lying reflection-increasing coating itself, or through grid spaces or gaps in the higher-lying reflection-increasing coating and displays a second optically variable effect in a second, different color.

Further, the security element is furnished in an interior layer, which is provided contiguously or in some regions, with at least one machine-readable feature substance.

In the following, the layer having the at least one machine-readable feature substance is also referred to as a machine-readable authenticating feature. The security element can also include two or more layers, which are provided contiguously or in some regions, each having at least one machine-readable feature substance, which layers are preferably all arranged interiorly in the security element. Here, "interiorly" means that the machine-readable authenticating feature is covered by at least one other layer of the security element. This can be one of the coloring layers of the structure, but also for example a reflector layer, a protective lacquer layer, a primer layer or a heat seal layer of the security element. Due to its interior position, the machine-readable authenticating feature is very durable in circulation and is protected against manipulative attacks. The interior arrangement especially protects the machine-readable authenticating feature against mechanical and physical influences, such as abrasion or crumpling, and against chemical influences, such as moisture, sweat or the effects of solar radiation.

Particularly advantageously, at least one machine-readable feature substance is integrated in the layer structure that produces the different appearances. Said layer structure comprises the reflection-increasing coatings, the lacquer layers in which the higher-lying and lower-lying relief structures are cast, and any coloring cover or intermediate layers of the relief structures. Due to the integration of the machine-readable feature substance in the layer structure that produces the different appearances, authenticating features of different levels are interwoven, and as a result, a particularly high barrier for potential imitators is established.

In one advantageous embodiment, at least one machine-readable feature substance is present, contiguously or in some regions, in a planar layer of the security element. Such a planar layer can be arranged not only between the relief structures, but especially also on a cover layer that levels a relief structure or on a carrier foil.

In the security element, it is preferably provided that the higher-lying and/or the lower-lying reflection-increasing coating include, contiguously or in some regions, at least one machine-readable feature substance. If the reflection-increasing coating consists of multiple sub-layers, each of the sub-layers can include a machine-readable feature substance. If the reflection-increasing coating comprises, for example, a translucent ink having an underlaid metalization, a machine-readable feature substance can be added to the translucent ink, a machine-readable feature substance can be formed by the underlaid metalization (for example the feature substance can be formed by a magnetic metal that is applied contiguously or in some regions), or a feature substance can be present, in addition to the translucent ink and the metalization, in an additional layer that is provided contiguously or in some regions as part of the reflection-increasing coating.

Likewise, it can advantageously be provided that the higher-lying relief structure is formed by an embossing lacquer layer whose embossing lacquer preferably includes at least one machine-readable feature substance. Alternatively, or additionally, the lower-lying relief structure can be formed by an embossing lacquer layer whose embossing lacquer preferably includes at least one machine-readable feature substance. Here, the embossing lacquer layers are advantageously colorlessly transparent or translucently tinted.

The at least one machine-readable feature substance advantageously forms a code that indicates, for example, a currency, a series, a denomination, and/or a lot of the security element.

IR-absorbing, IR-transparent, magnetic, electrically conductive and/or luminescent, especially phosphorescent, feature substances are preferably used as machine-readable feature substances.

Machine-readable feature substances that are transparent in the visible spectral range, such as transparent IR absorbers, transparent organic conductive substances or transparent magnetic materials, are particularly preferred. Said feature substances can be used, for example, in cover layers, embossing lacquer layers or color coatings through which the viewer must look. With them, machine-readable properties can be imparted to the security element without affecting or changing the visual appearance. Colored machine-readable feature substances can likewise be used and, in doing so, contribute systematically to the overall color effect of the security element.

Examples of suitable machine-readable IR substances are specified for instance in document WO 2007/060133 A1. In particular, iron (II) and copper (II) compounds having an $Fe^{2+}$ ion or a $Cu^{2+}$ ion in a suitable chemical environment may be used, a suitable chemical environment being, for example, a phosphate ion or a polyphosphate ion or, more generally, a group containing phosphorus and oxygen. These IR substances, which are broadband-absorbing in the NIR region (700 nm to 1100 nm), are transparent in the visible region (400 nm to 700 nm) of the electromagnetic spectrum, having at most a slight yellowish or bluish tone.

Particularly well-suited machine-readable IR substances are the pigments sold by SICPA (SICPA SA, Ave de Florian 41, 1008 Prilly, Switzerland) and the printing inks sold under the trade name SICPATALK, such as SICPATALK® CBA and SICPATALK® NFB. The latter are nearly colorless and thus, for a viewer, substantially non-visible in the visible spectral range. SICPATALK® CBA has a broadband absorption above 1100 nm, while SICPATALK® NFB has a broadband absorption with a center between 950 nm and 980 nm.

A machine-readable feature substance can also be formed by rare earths that are introduced into the substrate of the security element and whose presence can be detected with special sensors.

A further suitable machine-readable feature consists in a metallic layer having longitudinal slits that are transparent to THz radiation. Here, the longitudinal slits can be arranged (quasi-)periodically with a period of 8 μm to 200 μm, preferably 10 μm to 100 μm, and having a width that is less than ⅕, preferably less than ¹⁄₁₀ of the period.

In one advantageous development, the security element includes an authenticating feature having two or more different machine-readable feature substances, especially an authenticating feature having two or more IR-absorbing feature substances that absorb in different IR wavelength regions, an authenticating feature having two or more magnetic feature substances having different magnetic properties, especially different coercivities, or an authenticating feature having two or more luminescent feature substances that luminesce with different emission spectra or are excitable at different wavelengths. Due to the use of multiple different feature substances, both the code density and the counterfeit security of the element are increased.

The two or more different feature substances are advantageously provided next to one another, one on top of another, adjoining one another or overlapping in different sub-regions.

Of course, machine-readable feature substances of different kinds, for example an IR-absorbing and a magnetic feature substance, can also be combined.

At least one machine-readable feature substance is expediently present in a printing ink, especially a pigment printing ink. Alternatively, or additionally, at least one machine-readable feature substance is expediently present in a vapor-deposited layer. For example, a magnetic metal can be vapor deposited as a reflection-increasing coating or as part of such a coating to form a machine-readable authenticating feature.

In one advantageous embodiment, the higher-lying relief structure and/or the lower-lying relief structure are formed by micromirror arrangements having directionally reflective micromirrors, especially having non-diffractively behaving mirrors, and preferably having flat mirrors, concave mirrors and/or Fresnel-like mirrors. Here, the lateral dimensions of the micromirrors are expediently below 50 μm, advantageously below 20 μm, preferably, for instance, 10 μm, that is, between 7 μm and 13 μm. But on the other hand, the lateral dimensions of the micromirrors are also above 2 μm, especially above 3 μm or even above 5 μm. The rise of the micromirrors is preferably less than 10 μm, preferably less than 5 μm.

In principle, instead of micromirrors, also other embossed relief structures can be used, especially Fresnel lenses, concave mirrors, hologram structures, nanostructures or diffractive blazed gratings. Advantageously, also achromatic diffraction gratings, so-called matte structures, can be used that reflect substantially white light. To produce chromatic colors, the relief structures of at least the second relief structure can also comprise subwave structures, especially subwavelength gratings, which, in combination with the respective reflection-increasing layer, determines or at least codetermines the color of said layer.

Advantageously, the higher-lying relief structure is configured and formed to display a first optically variable effect in a first color, and the lower-lying relief structure is configured and formed to display, in the regions in which it is visible, a second optically variable effect in a second, different color. The different color effects can be produced in different ways, advantageous variants being described in greater detail below.

At least one of the reflection-increasing layers is advantageously formed by a reflective color coating, especially by a metalization, a thin-film structure, by a translucent ink backed with a metalization, by a luminescent ink having a metallic mirror coating, by a structural coloration and/or by a nanoparticle ink.

In one advantageous embodiment, the higher-lying reflection-increasing coating is formed, at least in a sub-region of the areal region, as a regular or irregular grid having grid elements and grid spaces, the dimensions of the grid elements and grid spaces being, in one or both lateral directions, below 140 μm, preferably between 20 μm and 100 μm, especially between 20 μm and 60 μm. The grid advantageously has a constant areal coverage by the grid elements, which is expediently between 30% and 70%, preferably between 40% and 60%, especially about 50%.

Alternatively, or additionally, it is advantageously provided that the higher-lying reflection-increasing coating is formed, at least in a sub-region of the areal region, as an effect region in which the lacquer regions and/or the free regions have lateral dimensions of more than 140 µm, preferably of more than 250 µm, further preferably of more than 500 µm and especially of more than 1 mm. In said effect regions, the security element preferably displays two different effects (for example a three-dimensional motif and a movement effect, such as a running bar) that appear in two different colors. Here, the regions of differing color impressions and of differing effects are exactly registered with each other, which is also referred to below as color-to-effect registration.

In one advantageous embodiment, the reflection-increasing layer of the lower-lying relief structure covers said relief structure completely. Alternatively, there can also be provided in the security element negative markings that are formed by gaps in the reflection-increasing layer. The negative markings can form, for example, text, symbols or value numerals.

The security element is advantageously a security thread, especially a window security thread or a pendulum security thread, a tear strip, a security band, a security strip, a patch or a label for application to a security paper, value document or the like.

The present invention also includes a data carrier having a security element of the kind described. The data carrier can especially be a value document, such as a banknote, especially a paper banknote, a polymer banknote or a foil composite banknote, a stock, a bond, a certificate, a voucher, a check, a valuable admission ticket, but also an identification card, such as a credit card, a bank card, a cash card, an authorization card, a personal identity card or a passport personalization page.

BRIEF DESCRIPTION OF THE DRAWINGS

Further exemplary embodiments and advantages of the present invention are explained below by reference to the drawings, in which a depiction to scale and proportion was dispensed with in order to improve their clarity.

Shown are.

DETAILED DESCRIPTION OF VARIOUS EMBODIMENTS

Figure 1:
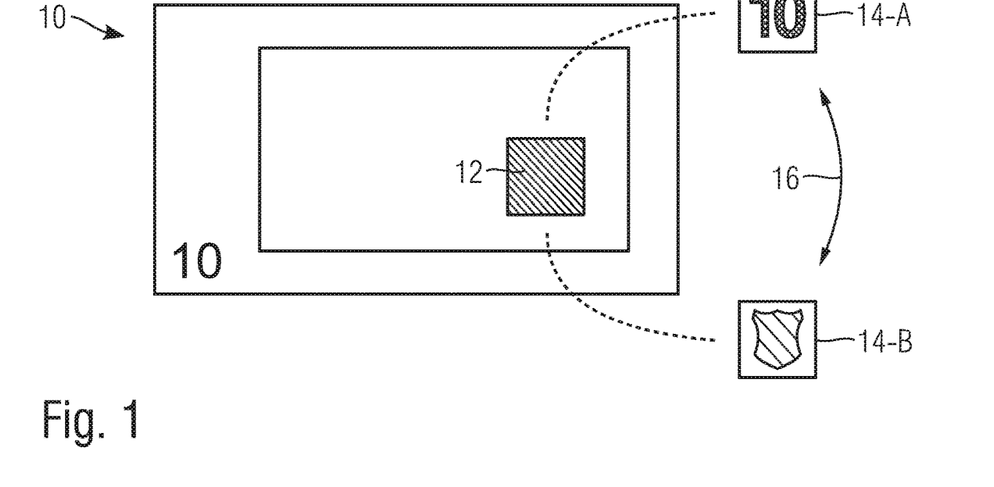
FIG. 1 a schematic diagram of a banknote having an optically variable security element according to the present invention, FIG. 2 a section of a security element according to the present invention, in cross section, FIG. 3 a security element according to a further exemplary embodiment of the present invention having a machine-readable authenticating feature in the form of a planar layer, FIGS. 4 and 5 two further variants of the present invention that include a machine-readable authenticating feature in the form of a planar layer, FIG. 6 including FIGS. 6(a) and 6(b), schematically, the fundamental structure of machine-readable optically variable security elements according to the present invention, and FIG. 7 to 16 further concrete embodiments of security elements according to the present invention.

The invention will now be explained using the example of security elements for banknotes. For this, FIG. 1 shows a schematic diagram of a banknote 10 having an inventive optically variable security element 12 in the form of an affixed transfer element. However, it is understood that the present invention is not limited to transfer elements and banknotes, but rather can be used in all kinds of security elements, for example in labels on goods and packaging, or in safeguarding documents, identity cards, passports, credit cards, health cards and the like. In the case of banknotes and similar documents, in addition to transfer elements (such as patches with or without their own carrier layer), especially also security threads or security strips may be used.

Despite its planar formation, the security element 12 shown in FIG. 1 conveys to the viewer a three-dimensional impression and, at the same time, displays a binary color and effect change when the banknote 10 is tilted. Here, the security element 12 displays, from a first viewing direction, a first motif 14-A that appears to bulge out of the plane of the banknote 10, concretely, for example, a curved depiction of the value numeral "10" that appears having a first color, for example red. From a second viewing direction, the security element 12 displays a second motif 14-B that appears to bulge out of the plane of the banknote 10, for example a curved depiction of a crest that appears having a second color, for example blue.

Upon tilting 16 the banknote 10, or a corresponding change in the viewing direction, the appearance of the security element 12 suddenly jumps from the first appearance to the second, or upon tilting back, from the second appearance to the first. Here, the change in the motif and the color occurs simultaneously and without any intermediate or transitional stage in which both motifs or colors are visible, or one motif is visible in the color of the other motif. The appearance therefore jumps transitionlessly between two appearances 14-A, 14-B and is thus referred to as a binary color and effect change.

In addition to its attractive visual appearance and complex structure, which, as such, already constitutes a high barrier to counterfeiting, the security element 12 includes a machine-readable authenticating feature that, in the exemplary embodiment, is integrated in the layer structure that produces the different appearances and that permits a machine-readable code in the banknote 10, for example relating to the currency, the series, the denomination and/or the lot. Due to the integration of the machine-readable authenticating feature in the visual layer structure, authenticating features of different levels are inseparably interwoven, which creates a particularly high counterfeit security. A potential counterfeiter would, namely, have to not only reproduce the visual impression of the security element, but also detect the presence and the kind of encoding of the machine-readable feature and, moreover, integrate said feature in the correct place in the visual layer structure, without, however, compromising the visual appearance in doing so.

The special structure of the machine-readable security element in FIG. 1 will now be explained in greater detail with reference to the schematic cross-sectional diagram in FIG. 2, which shows a section of the security element 12 applied to the banknote 10.

The security element 12 includes an areal carrier 18 that, through its areal expanse, defines an x-y plane and a z-axis perpendicular thereto. Set up on the carrier 18 is a multi-colored reflective areal region that includes two relief structures 24, 34 that are arranged at two certain, different height levels in the z-direction with respect to the areal carrier 18. In the exemplary embodiment, the embossing structure regions each constitute micromirror embossing or micromirror arrangements 24, 34, each of which is formed from a plurality of micromirrors that are inclined against the x-y plane. Here, the local inclination angles of the micromirrors are chosen just such that the relief structure of the micromirror arrangements 24, 34, after their coating, produces in each case a desired optical appearance. The different height levels of the micromirror arrangements are defined by the different heights of the base areas of the micromirror arrangements 24, 34 above the carrier 18.

To produce a visual contrast with the desired color effect, the micromirror arrangements 24, 34 are each furnished with a reflection-increasing coating 26, 36 that, when viewed, produce the different color impressions of the micromirror arrangements. For example, the micromirror arrangement 24 in the exemplary embodiment is furnished with a reflection-increasing coating 26 that is formed by a red translucent ink backed with a metalization. The micromirror arrangement 34 is furnished in some regions with a reflection-increasing coating 36 that is formed by a blue translucent ink that is backed with a metalization and that additionally has an added machine-readable feature substance 62 in sub-regions.

To form the relief structures, the micromirror arrangements 24, 34 are each embossed in a transparent embossing lacquer layer 22, 32 and, after the application and, if applicable, structuring of the respective coating 26, 36, leveled with a transparent topcoat layer 28 and 38, respectively. The topcoat layers have substantially the same refractive index as the embossing lacquer layers 22, 32, such that the micromirrors in regions without the color coating do not appear visually due to the lack of refractive index difference between the embossing lacquer layer and the topcoat layer.

Figure 2:
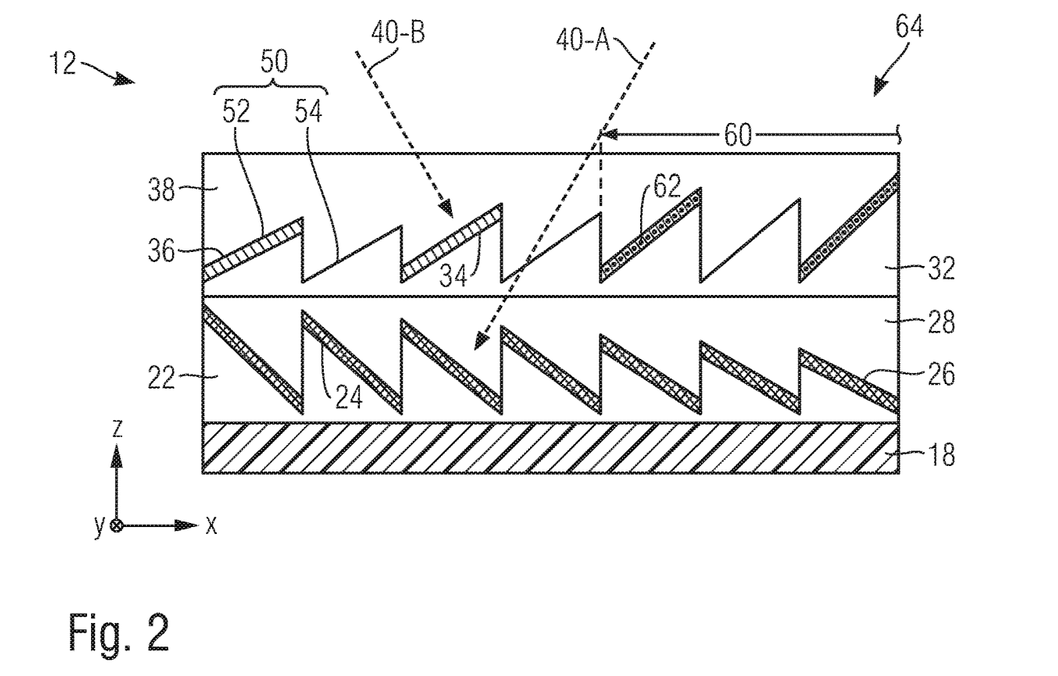

The security element 12 is configured for viewing in reflection, that is, in the diagram in FIG. 2, from above, such that the micromirror arrangement 24 that is farther away from the viewer is referred to as the lower-lying micromirror arrangement, and the micromirror arrangement 34 that is closer to the viewer is referred to as the higher-lying micromirror arrangement.

In the exemplary embodiment, the two micromirror arrangements 24, 34 are arranged one on top of another in the entire areal region of the security element 12. While the red reflection-increasing coating 26 of the lower-lying micromirror arrangement 24 is continuous, the blue reflection-increasing color coating 36 of the higher-lying micromirror arrangement 34 is formed, in a feature region of the security element, in the form of a regular grid 50 composed of grid elements 52 and grid spaces 54. Specifically, in the exemplary embodiment, the grid elements 52 and grid spaces 54 form a checkerboard pattern in which each square, that is, each grid element 52 and each grid space 54, has a dimension of 100 μm×100 μm. Since the micromirrors are normally considerably smaller, for example have an edge length of just 10 μm, the grid 50 of the reflection-increasing coating 36, unlike in the simplified schematic diagram in FIG. 2, generally does not coincide with the grid of the micromirrors in the micromirror arrangement 34.

From the viewing direction 40-A, the micromirrors in the micromirror arrangement 34 exhibit no optical effect in the grid spaces 54 due to the lack of refractive index difference between the lacquer layers 32, 38, such that, there, the viewer 40 looks at the red-coated micromirrors of the micromirror arrangement 24 that, for the viewing direction 40-A, are located substantially in the glancing angle. In the region of the grid elements 52, the micromirrors of the micromirror arrangement 34 are, in principle, perceptible, but their orientation is far away from the glancing angle and therefore, from the viewing direction 40-A, they appear inconspicuous and practically do not contribute to the image impression. Overall, substantially the red appearance 14-A of the curved value numeral "10", produced by the micromirror arrangement 24, thus presents itself to the viewer from viewing direction 40-A.

From the viewing direction 40-B, in the region of the grid elements 52, the viewer looks at the blue-coated micromirrors of the micromirror arrangement 34. In the region of the grid spaces 54, the viewer can, in principle, perceive the micromirrors of the lower-lying micromirror arrangement 24, but from viewing direction 40-B, their orientation is far away from the glancing angle. The micromirror arrangement 24 thus appears inconspicuous and practically does not contribute to the image impression. Overall, substantially the blue appearance 14-B of the curved crest, produced by the micromirror arrangement 34, thus presents itself to the viewer from viewing direction 40-B.

The higher-lying reflection-increasing coating 36 includes, in sub-regions 60, a machine-readable feature substance, for example a visually transparent, IR-absorbing feature substance 62 that does not affect the visual color impression of the higher-lying micromirror arrangement 24. The arrangement of the sub-regions 60 with the IR-absorbing feature substance and the sub-regions without the IR-absorbing feature substance forms a machine-readable code 64 that can be read out by impinging on the security element with IR radiation and measuring the IR response, for example the different IR reflection in some regions. The code 64 can constitute, for example, the denomination or a series number of the banknote 10 in encoded form.

The code can not only consist in a sequence of sub-regions with and without a feature substance but can also be formed to be more complex. For example, in the machine-readable authenticating feature, different IR-absorbing feature substances can be used that absorb in different IR wavelength regions and that are provided next to one another, one on top of another, adjoining one another or overlapping in different sub-regions of the coating 36. Also the use of IR-transparent feature substances is possible. By using different feature substances, both the code density and the counterfeit security of the element can be increased.

In other designs, the code 64 can include, as machine-readable feature substances, magnetic substances that, for example, can be imprinted in the form of a pigment ink or vapor deposited as a magnetic metal. The machine-readable feature substances used can also comprise other machine-readable properties, such as luminescence, especially phosphorescence or electrical conductivity, especially organic transparent conductivity.

Since the code 64 formed by the feature substance 62 lies in the interior of the security element, it is protected by the adjoining layers against mechanical, physical and chemical influences and is thus very durable in circulation. The interior arrangement also protects the machine-readable feature 64 against manipulative attacks and, in this way, leads to a further increased barrier to counterfeiting.

The machine-readable feature substance 62 can be introduced or applied in different ways. If the reflection-increasing coating constitutes, as in the exemplary embodiment, a translucent ink on a metalization, the machine-readable feature substance 62 can be added, for example, to the translucent ink in the sub-regions 60, it can be part of the metalization, for example in that a magnetic metal is applied in sub-regions 60, or the feature substance can be present in an additional layer that, in the sub-regions 60, is provided in addition to the translucent ink and the metalization.

The higher-lying reflection-increasing coating can not only be structured as a grid having small grid elements and grid spaces, alternatively or additionally, it can also be provided that the higher-lying reflection-increasing coating is furnished in effect regions with larger gaps (larger than 140 μm, especially larger than 250 μm, 500 μm, or even 1 mm) and displays there an appearance that is referred to as a color-to-effect registration. Even if the present invention is illustrated in part with reference to exemplary embodiments having a binary color and effect change and in part with reference to exemplary embodiments having color-to-effect registration, it is understood that the combination with machine-readable feature substances described in each case can also be affected in designs of the respective other appearance.

Figure 3:
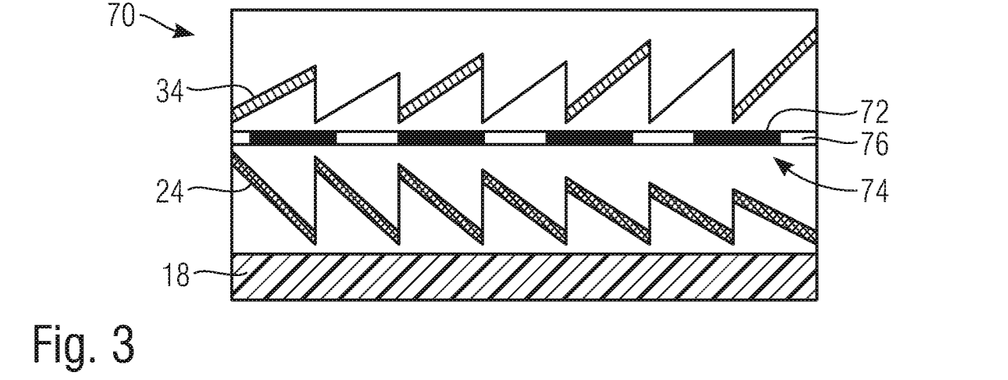

The machine-readable security element 70 depicted in FIG. 3 is structured, with regard to the formation of the optically variable appearance, like the security element in FIG. 2, but differs in the arrangement of the machine-readable authenticating feature. In the security element 70, the machine-readable authenticating feature is present in the form of a planar layer 76 that is arranged between the higher-lying micromirror arrangement 34 and the lower-lying micromirror arrangement 32. In the exemplary embodiment shown, the layer 76 includes sub-regions with and sub-regions without a machine-readable feature substance 72 and, in this way, forms a machine-readable code 74.

In other embodiments, the layer 76 is formed to be contiguous such that the machine-readable feature consists in the presence or the properties of the layer 76 itself. As in FIG. 2, especially IR-absorbing, IR-transparent, magnetic, electrically conductive and/or luminescent, especially phosphorescent, feature substances may be used as machine-readable feature substances. The layer 76 can be formed to be visually colorlessly transparent or have a color effect and form a colored flat structure that contributes to the overall color effect of the security element 70. The code 74 is embedded in the interior of the security element 70 and is protected by the adjoining layers against mechanical, physical and chemical influences and against manipulative attacks.

Figure 4:
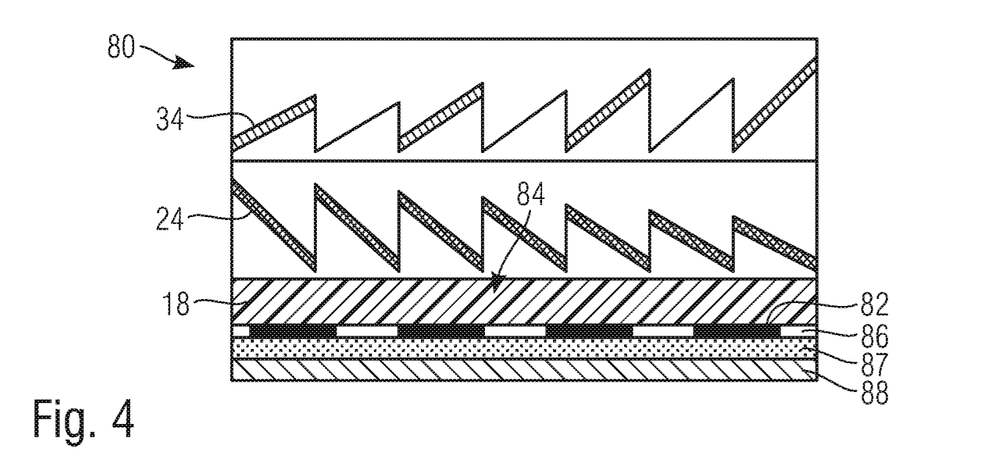
Figure 5:
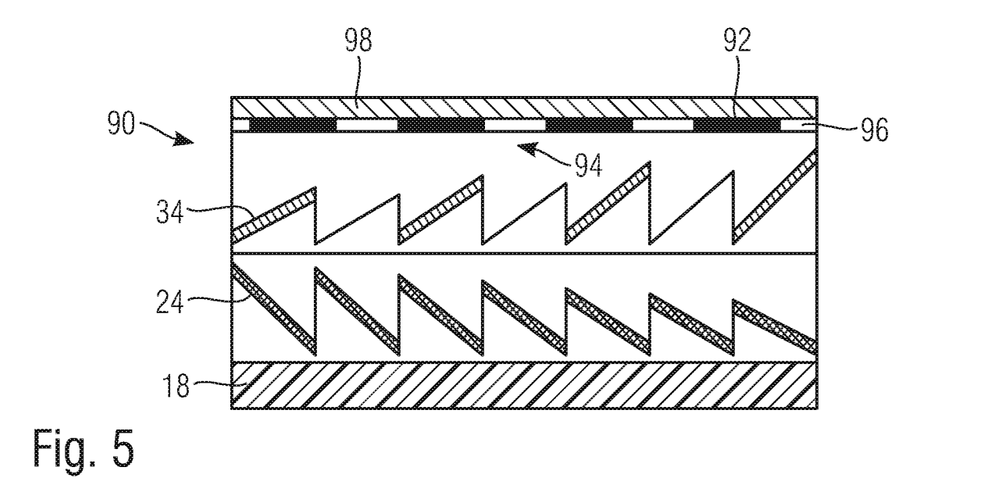

FIGS. 4 and 5 show two further variants that, in modification of the security element 70 in FIG. 3, include a machine-readable authenticating feature in the form of a planar layer. In the security element 80 in FIG. 4 is provided, on the side of the carrier foil 18 opposite the micromirror arrangements 24, 34, a planar layer 86 having sub-regions with and having sub-regions without a machine-readable feature substance 82, which forms a machine-readable code 84. The layer 86 is covered by a reflector layer 87, for example composed of aluminum and an additional layer 88, which can be, for example, a protective lacquer layer or an adhesion promoter layer.

In the security element 90 in FIG. 5, the planar layer 96 having the code 94 composed of sub-regions with and without a machine-readable feature substance 92 is provided on the same side of the carrier 18 as the micromirror arrangements 24, 34, arranged above said micromirror arrangements in the viewing direction. The planar layer 96 is covered with an additional layer 98, for example a protective lacquer layer.

Also, in the embodiments in FIGS. 4 and 5, the layers 86 and 96, respectively, can also be formed to be contiguous and they can be visually colorlessly transparent or contribute to the color effect of the security element 80 or 90, respectively. The codes 84, 94 likewise lie in the interior of the respective security element and are protected by the adjoining layers against mechanical, physical and chemical stresses and against manipulative attacks.

Figures 6, 6A, 6B:
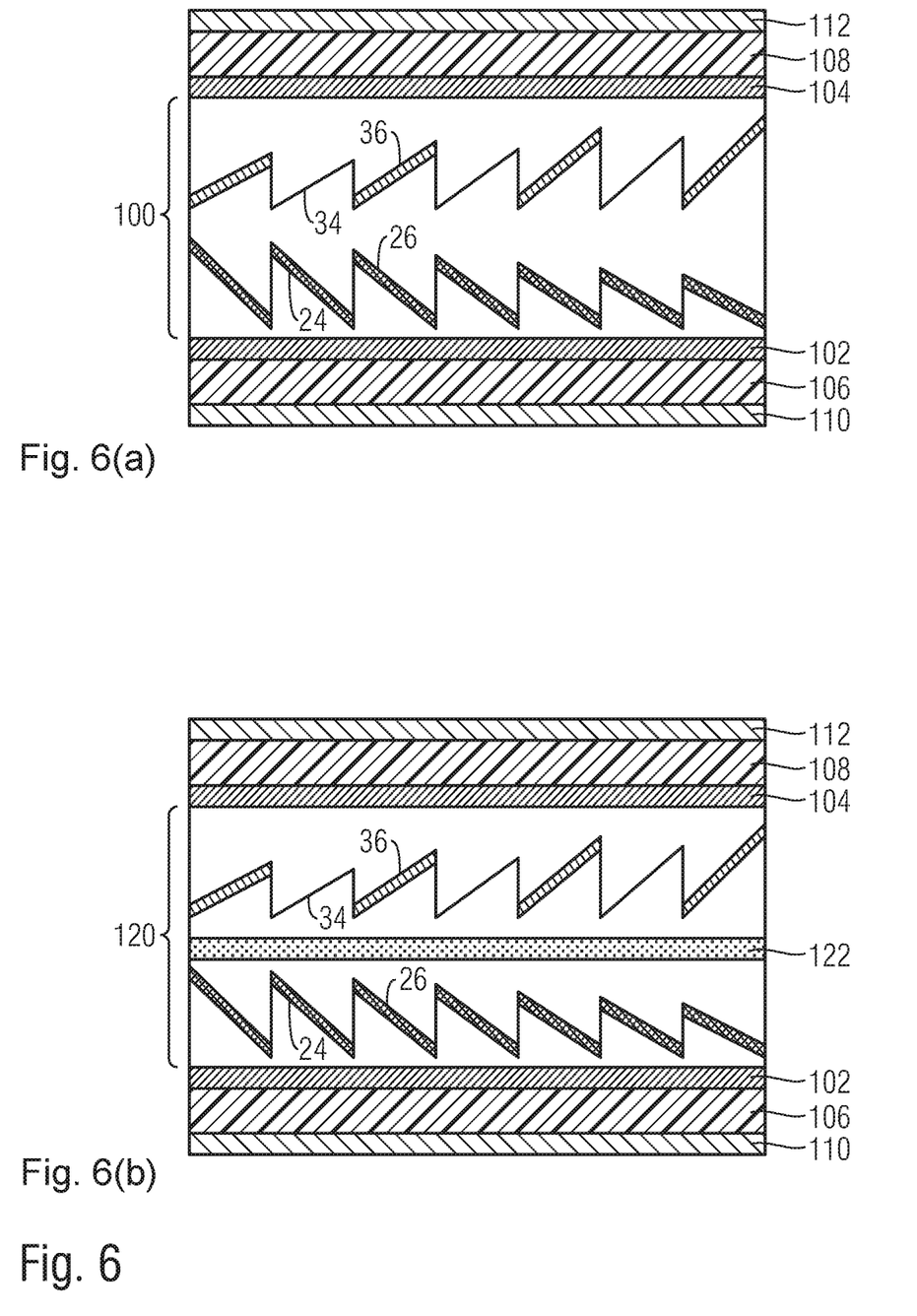

FIG. 6 shows, in 6(a) and 6(b), schematically, the fundamental structure of machine-readable optically variable security elements according to the present invention. Here, in FIG. 6(a), the reference sign 100 designates a single-layer effect structure in which the two relief structures 24, 34 and their reflection-increasing coatings 26, 36 lie one on top of another without any intermediate layer. In FIG. 6(b), the security element includes a double-layer effect structure 120 in which an intermediate layer 122, for example a light-transmitting colored flat structure, is arranged between the relief structures 24, 34 and their respective reflection-increasing coatings 26, 36.

In both structure variants, the reference sign 102 designates a lower layer, 104 an upper layer, 106 an optional lower carrier foil or auxiliary foil, 108 an optional upper carrier or auxiliary foil, 110 an optional lower outer layer and 112 an optional upper outer layer. The lower layer, the upper layer, the lower outer layer and the upper outer layer can be formed by a layer of a protective lacquer, of an adhesion promoter, of a reflector or of a heat seal adhesive, or consist of a combination of the said layers.

A machine-readable feature substance can be provided in the lower layer 102, the upper layer 104, in the lower or upper carrier foil or auxiliary foil 106, 108, in the intermediate layer 122, in one of the embossing lacquer layers 22, 32 and/or in one of the reflection-increasing coatings 26, 36. As described above, a machine-readable feature substance is advantageously integrated in the single-layer-effect structure 100 or the double-layer effect structure 120 and is particularly advantageously present in the intermediate layer 122, in at least one of the embossing lacquer layers 22, 32 and/or at least one of the reflection-increasing coatings 26, 36.

With reference to FIGS. 7 to 16, some additional concrete embodiments of security elements according to the present invention will now be described for illustration.

Figure 7:
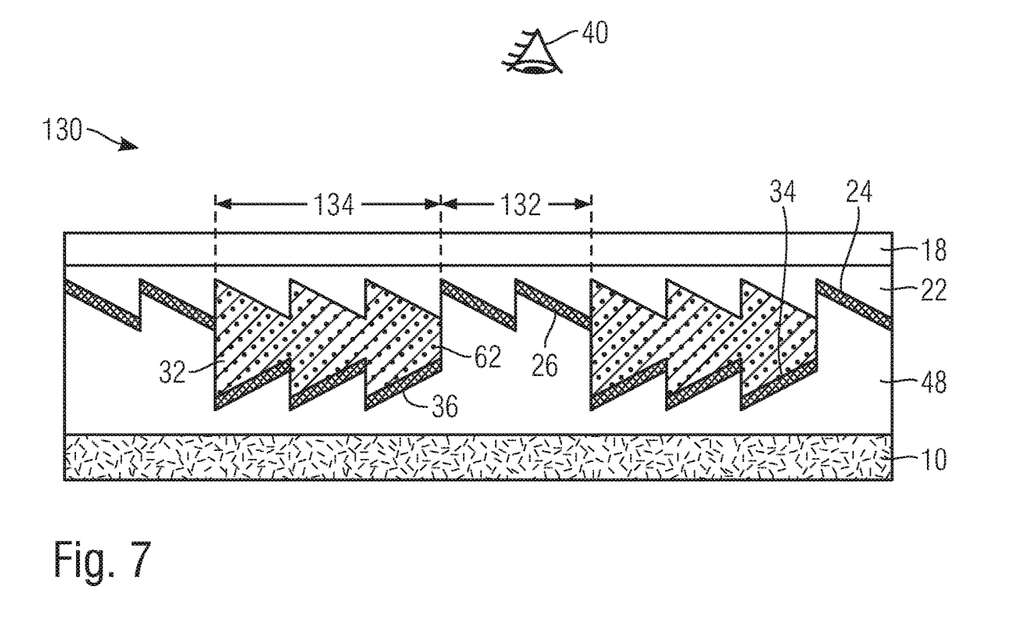

FIG. 7 shows, schematically, applied on a banknote 10, a section of a security element 130 in which the visual contrast of the micromirror arrangements 24, 34 is created by an interplay of different color effects of the embossing lacquer layers involved and the color effect of a uniform reflection-increasing coating.

The security element 130 includes an areal, transparently colorless carrier 18 having a multicolored reflective areal region that includes an embossing structure region having micromirror embossings 24, 34 at two different height levels.

A first embossing region 24 is formed by micromirror embossings whose base areas lie at a first height above the carrier 18, while a second embossing region is given by micromirror embossings 34 whose base areas lie at a second, greater height above the carrier 18. As indicated by the position of the viewer 40, the security element 130 is configured for viewing from the side of the carrier 18, such that the micromirror embossings 34 form the lower-lying micromirror arrangement, and the micromirror embossings 24 form the higher-lying micromirror arrangement.

The micromirror embossings or micromirror arrangements 24, 34 each include, as in the exemplary embodiment in FIG. 2, a plurality of micromirrors that are inclined against the x-y plane and whose local inclination angles are chosen just such that the relief structures of the micromirror embossings 24, 34, in interplay with the color effects of the embossing lacquer layers 22, 32 and the color effect of the reflection-increasing coating 26, 36 applied uniformly to the micromirror embossings, produce a desired optical appearance.

While the embossing lacquer layer 22 in which the micromirror arrangement 24 is embossed is transparently colorless, the embossing lacquer layer 32 in which the micromirror arrangement 34 is embossed is translucent, for example tinted translucently blue. The micromirror arrangements 24, 34 are each furnished with a reflection-increasing coating 26, 36 that, in the exemplary embodiment, is formed by a metalization applied at the same time in the same operation. Specifically, the reflection-increasing coatings 26, 36 are formed, for example, by a thin vapor deposited silver layer having a silvery metallic color effect.

The desired visual contrast of the micromirror arrangements 24, 34 from the different viewing positions of the viewer 40 is created by the interplay of the different color effects of the embossing lacquer layers 22, 32 and the color effect of the uniform reflection-increasing coating 26, 36. While, in the sub-region 134, the viewer 40 looks through the translucent blue embossing lacquer layer 32 at the micromirror arrangement 34 having the silver layer 36, the visual impression in the region 132 is determined solely by the micromirror arrangement 24 and thus only by the color effect of the silver layer 26.

To produce a machine-readable feature, in the exemplary embodiment in FIG. 7, the translucent blue embossing lacquer layer 32 is additionally furnished, completely or in some regions, with a machine-readable feature substance, for example an IR-absorbing substance 62 or a magnetic substance whose presence can be machine read.

Figure 8:
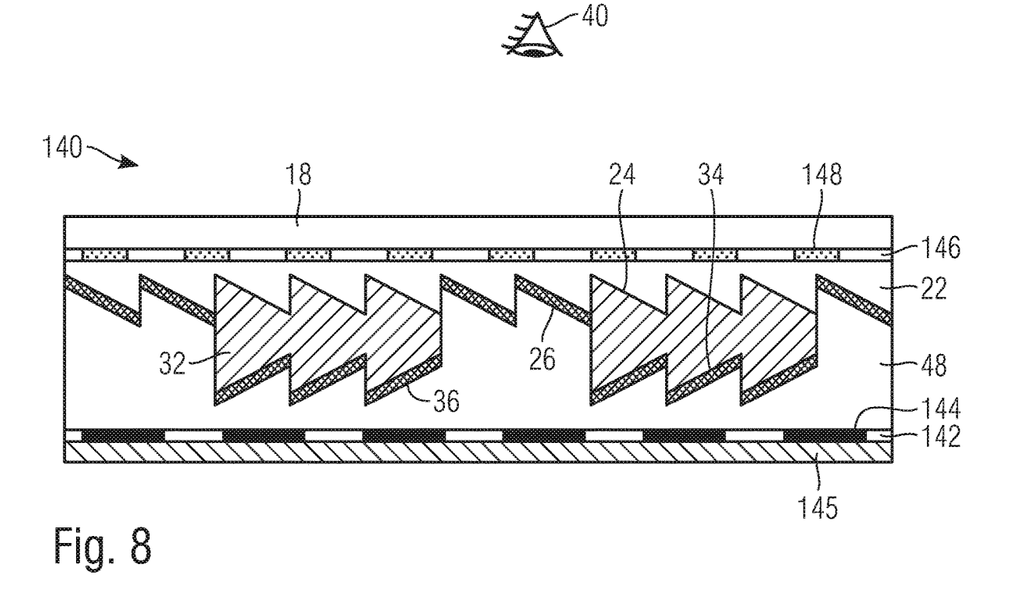

The exemplary embodiment in FIG. 8 shows a security element 140 that is based on the same coloring principle as the embodiment in FIG. 7. However, the machine-readable feature in this embodiment is not formed in the embossing lacquer layer 32, but in separate planar layers 142, 146. A first machine-readable layer 142 is arranged over a lacquer coating 48, below the two micromirror arrangements 24, 34 in the viewing direction, and comprises sub-regions with and sub-regions without a magnetic feature substance 144 to form a magnetic code in the security element 140. The machine-readable layer 142 is covered by at least one additional layer 145, for example a reflector layer and/or a protective layer.

A second machine-readable layer 146 is arranged between the carrier 18 and the higher-lying embossing lacquer layer 22 above the two micromirror arrangements 24, 34 in the viewing direction. The second machine-readable layer 146 comprises sub-regions having an IR-absorbing, visually transparent feature substance 148 and sub-regions without such a feature substance, and in this way, forms a second machine-readable code in the security element 140. The second machine-readable layer 146 can also be provided on the side of the carrier 18 facing away from the micromirror arrangements and, in this case, is covered by an additional layer, for example a transparent protective lacquer layer. It is understood that also only one of the two machine-readable layers 142, 146 can be provided in the security element 140.

Figure 9:
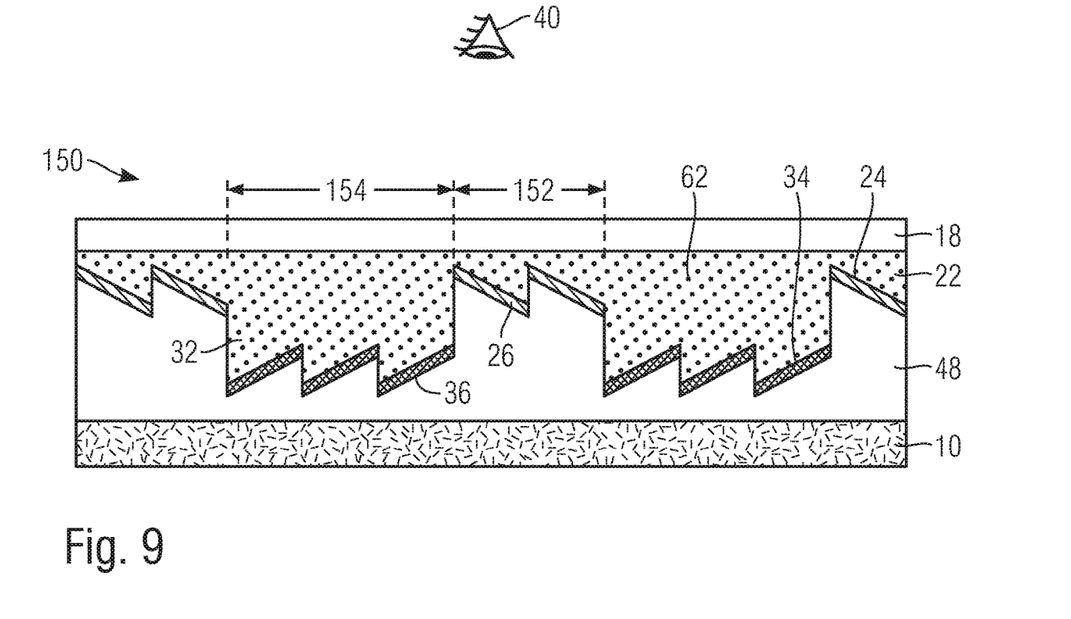

The further exemplary embodiment in FIG. 9 shows, schematically, a section of a security element 150 applied to a banknote 10. To a transparent PET carrier foil 18 is applied an embossing lacquer layer 22, 32 that includes micromirror embossings 24, 34 on two different height levels. The embossing lacquer is colorlessly transparent in the visible spectral range and is furnished with an IR-absorbing feature substance 62. The desired, visually different appearance of the regions 152, 154 having the micromirror arrangements of different heights is achieved through different color coatings 26, 36 of the micromirror arrangements. Since the embossing lacquer layer 22, 32 in the sub-region 154 has a greater layer thickness than the embossing lacquer layer 22 in the sub-region 152 alone, in addition, an IR-absorption is created that is modulated by the form of the regions 152, 154 and that forms a machine-readable authenticating feature. As indicated by the position of the viewer 40, the security element 150 is configured for viewing from the side of the carrier 18 and through the embossing lacquer layers 22, 32.

Figure 10:
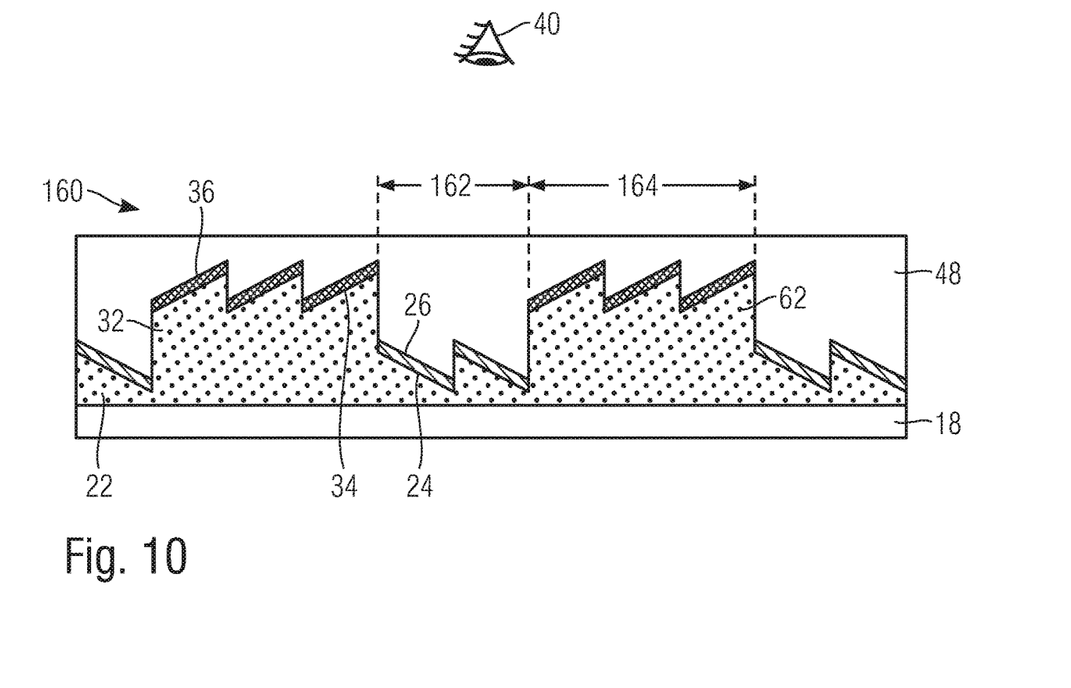

The security element 160 in FIG. 10 comprises a similar structure, but includes, as the machine-readable feature substance in the embossing lacquer layers 22, 32, a magnetic feature substance 62. The security element 160 is configured for viewing from the side facing away from the embossing lacquer layers 22, 32 and through a transparent lacquer layer 48, such that any potential dark coloring of the magnetic feature substance 62 in the visual appearance of the security element does not appear. Here, too, the different appearances of the regions 162, 164 is achieved through different color coatings 26, 36 of the micromirror arrangements 24, 34. Since the combined embossing lacquer layers 22, 32 in the sub-region 164 have a greater layer thickness than the embossing lacquer layer 22 of the sub-region 162 alone, upon machine-reading, a magnetic signal is created that is modulated by the form and arrangement of the sub-regions 162, 164 and that constitutes a machine-readable authenticating feature.

Figure 11:
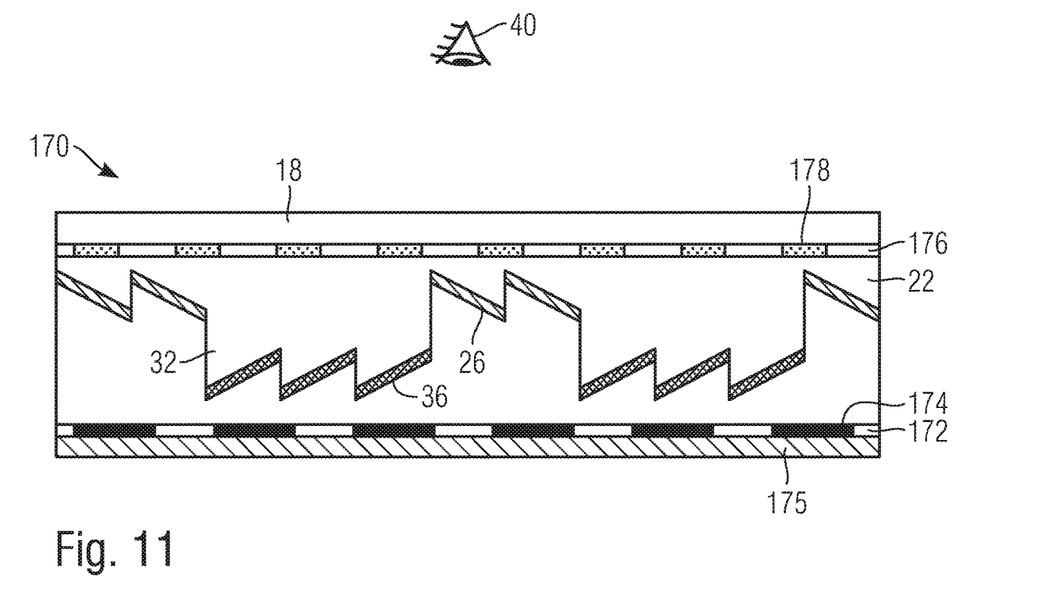

The exemplary embodiment in FIG. 11 shows a security element 170 that is based on the same coloring principle as the embodiment in FIG. 9, and in which especially the embossing lacquer layers 22 and 32 of the two micromirror arrangements 24, 34 are formed by the same embossing lacquer, and a visually different appearance is achieved through different color coatings 26, 36 of the micromirror arrangements.

However, in this embodiment, machine-readable features are not formed in one of the embossing lacquer layers 22, 32, but rather in separate planar layers 172, 176. A first machine-readable layer 172 is arranged, via a lacquer coating 48, below the two micromirror arrangements 24, 34 in the viewing direction and comprises sub-regions with and sub-regions without a magnetic feature substance 174 to form a magnetic code in the security element 170. The machine-readable layer 172 is covered by at least one additional layer 175, for example a reflector layer and/or a protective layer.

A second machine-readable layer 176 is arranged between the carrier 18 and the embossing lacquer layer 22 above the two micromirror arrangements 24, 34 in the viewing direction. The machine-readable layer 176 comprises sub-regions with and sub-regions without an IR-absorbing, visually transparent feature substance 178 to form a second machine-readable code in the security element 170. The second machine-readable layer 176 can also be provided on the opposing side of the carrier 18 and, in this case, is covered by an additional layer, for example a protective layer. It is understood that also only one of the two machine-readable layers can be provided in the security element 170.

Figure 12:
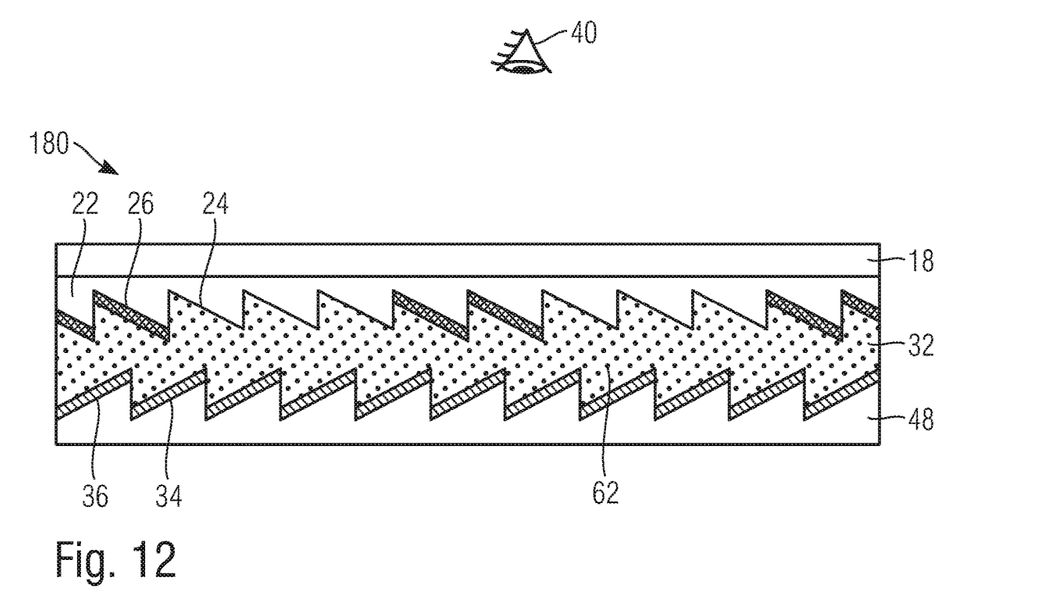

A further design is illustrated in FIG. 12. In the security element 180, a first embossing lacquer layer 22 was applied on a transparent PET carrier foil 18, furnished with a first, higher lying micromirror embossing 24 and provided in some regions with a first metalization 26 for coloring. To this arrangement was contiguously applied a second embossing lacquer layer 32 that is colorlessly transparent in the visible spectral range and is furnished with an IR-absorbing feature substance 62. The second embossing lacquer layer 32 is furnished with a second micromirror embossing 34 that forms the lower-lying micromirror arrangement, which is furnished contiguously with a second metalization 36 for coloring and leveled with a lacquer layer 48. As indicated by the position of the viewer 40, the security element 170 is configured for viewing through the carrier.

Figure 13:
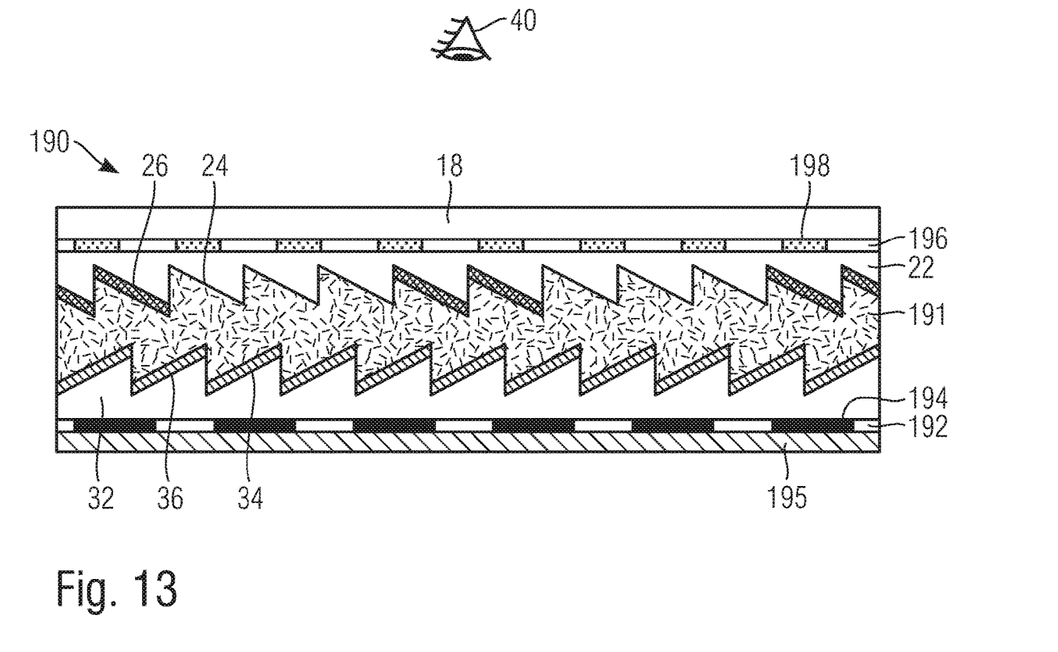

The further exemplary embodiment in FIG. 13 shows a security element 190 having a PET carrier foil 18 to which a machine-readable layer 196 having sub-regions with and having sub-regions without an IR-absorbing, visually transparent feature substance 198 is applied. On the machine-readable layer 196 is arranged a first embossing lacquer layer 22 having a first micromirror embossing 24 and a first metalization 26 that is present in some regions. Further, the security element 190 includes a layer sequence composed of a second embossing lacquer layer 32 having a second micromirror embossing 34 and a contiguous second metalization 36 that was initially set up on an auxiliary carrier foil and then laminated onto the first-mentioned layer sequence via a colored laminating adhesive layer 191.

Thereafter, the auxiliary carrier foil was removed and the exposed second embossing lacquer layer was furnished with a further machine-readable layer 192 that comprises sub-regions with and sub-regions without a magnetic feature substance 194 to create, in addition to the IR code in the layer 196, also a magnetic code in the security element 190. The machine-readable layer 192 is covered by at least one additional layer 195, for example a reflector layer and/or a protective layer. It is understood that also only one of the two machine-readable layers can be provided in the security element 190.

Figure 14:
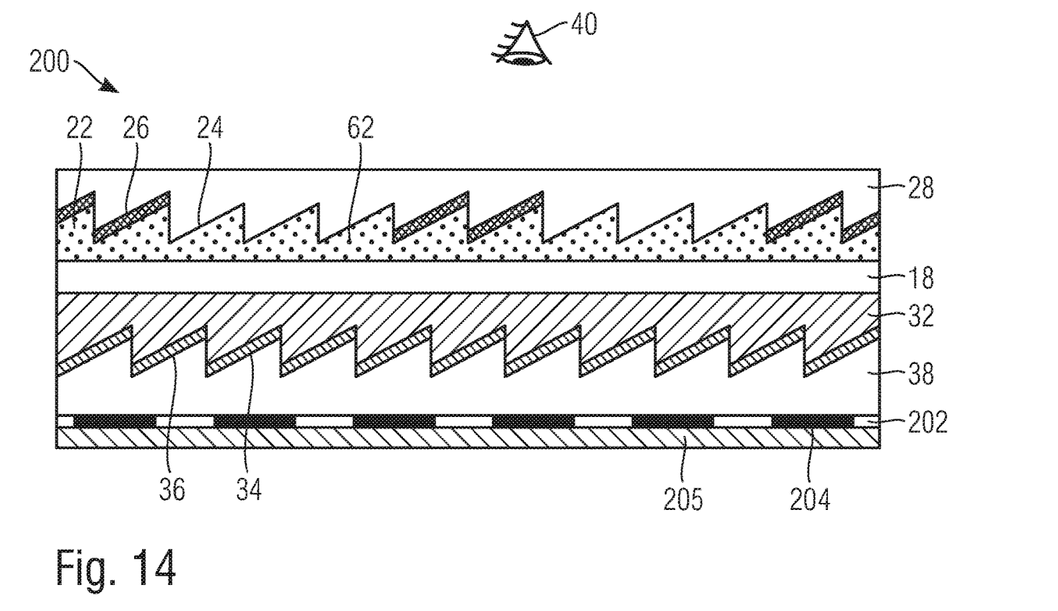

In the exemplary embodiment in FIG. 14, the two micromirror arrangements 24, 34 of the security element 200 are arranged on different sides of a transparent PET carrier foil 18. The first arrangement, provided on the top of the carrier 18, comprises a first embossing lacquer layer 22 that is colorlessly transparent in the visible spectral range and is furnished with the IR-absorbing feature substance 62. In the first embossing lacquer layer 22 is embossed a first micromirror arrangement 24, said micromirror arrangement furnished in some regions with a first metalization 26 for coloring, then leveled with a transparent cover layer 28.

On the opposing bottom of the carrier 18 is provided a second arrangement that comprises a second embossing lacquer layer 32 that is light-transmittingly tinted in the visible spectral range and that is furnished with a second micromirror embossing 34 and provided contiguously with a second metalization 36 for further coloring. The second arrangement is leveled with a primer or protective lacquer layer 38 on which is arranged a machine-readable layer 202 that comprises sub-regions with and sub-regions without a magnetic feature substance 204. In this way, in addition to the machine-readable IR code of the embossing lacquer layer 22, a machine-readable magnetic code is also formed in the security element 200. As indicated by the position of the viewer 40, the security element 200 is configured for viewing from the top of the carrier 18. It is understood that also only one of the two machine-readable layers can be provided in the security element 200.

Figure 15:
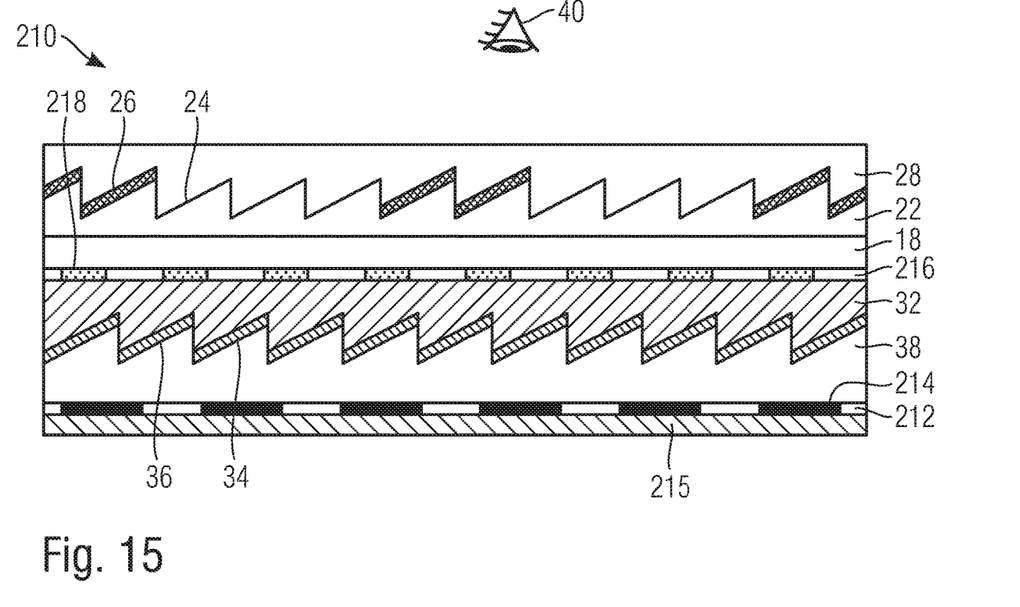

Also in the security element 210 in FIG. 15, two micromirror arrangements 24, 34 are arranged on different sides of a transparent PET carrier foil 18. Here, the first arrangement provided on the top of the carrier 18 comprises a first embossing lacquer layer 22 that can be colorless or tinted, a first micromirror embossing 24, a metalization 26 that is provided in some regions, and a leveling topcoat layer 28.

On the opposing bottom of the carrier 18 is applied a first machine-readable layer 216 having sub-regions with and sub-regions without an IR-absorbing, visually transparent feature substance 218. On this machine-readable layer 216 is provided a second arrangement that comprises a second embossing lacquer layer 32 that is light-transmittingly tinted in the visible spectral range and that is furnished with a second micromirror embossing 34, is provided contiguously with a second metalization 36 for further coloring and, finally, is leveled with a primer or protective lacquer layer 38. On this protective lacquer layer 38 is arranged a second machine-readable layer 212 that comprises sub-regions with and sub-regions without a magnetic feature substance 214 and that is covered by at least one additional layer 215, for example a reflector layer and/or a protective layer. In this way, in addition to the IR code in the layer 216, also a magnetic code is formed in the security element 210. It is understood that also only one of the two machine-readable layers can be provided in the security element 210. As indicated by the position of the viewer 40, the security element 210 is configured for viewing from the top of the carrier 18.

Figure 16:
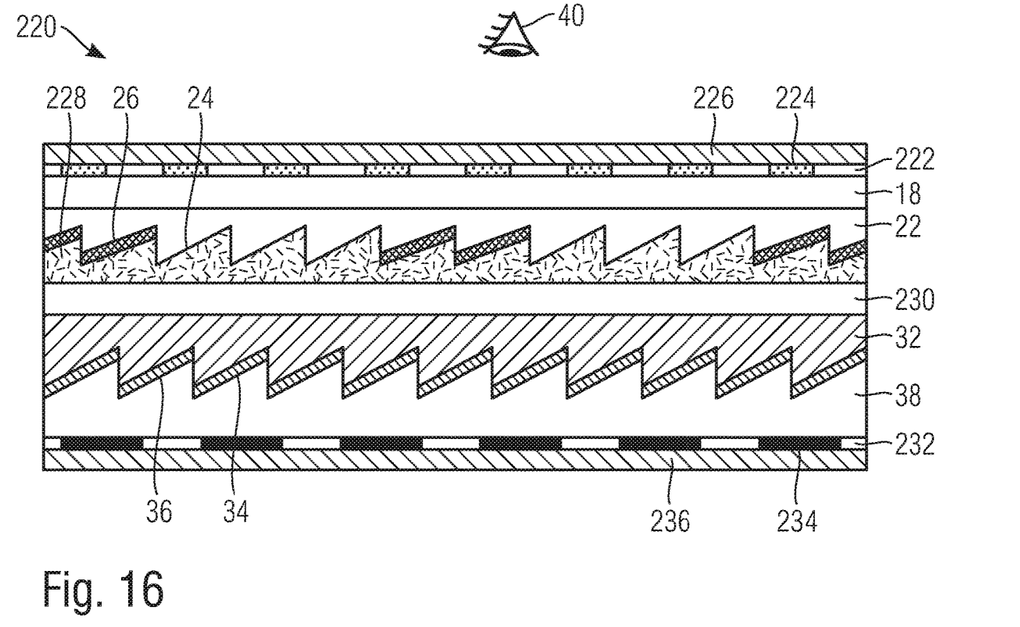

FIG. 16 shows a further variant of a security element 220 according to the present invention. Here, on the top of a first transparent PET carrier foil 18 is formed a machine-readable layer 222 having sub-regions with and sub-regions without an IR-absorbing, visually transparent feature substance 224, and covered with a protective lacquer layer 226. On the bottom of the first carrier foil 18 is set up a first arrangement that comprises a first, colored or colorless embossing lacquer layer 22, a first micromirror embossing 24 and a first metalization 26 that is provided in some regions.

On the bottom of a second transparent PET carrier foil 230 is set up a second arrangement that comprises a second, colored or colorless embossing lacquer layer 32, a second micromirror embossing 34 and a second metalization 36 that is present contiguously and that is leveled with a primer or protective lacquer layer 38. On said protective lacquer layer 38 is arranged a machine-readable layer 232 that comprises sub-regions with and sub-regions without a magnetic feature substance 234 and that is covered by at least one additional layer 236, for example a reflector layer and/or a protective layer.

The second transparent PET carrier foil 230 is laminated with its top onto the first arrangement 22, 24, 26 of the first carrier foil 18 via a colored laminating adhesive 228 such that the complete structure shown in FIG. 16 is created. As indicated by the position of the viewer 40, the security element 220 is configured for viewing from the top of the first carrier foil 18.

The invention claimed is:

1. An optically variable security element for securing valuable articles, whose areal expanse defines a z-axis perpendicular thereto, having a reflective areal region that displays at least two appearances that are perceptible from different viewing directions,
   the reflective areal region including two relief structures that are arranged at different height levels in a z-direction and form a lower-lying and a higher-lying relief structure, each of which is furnished with a reflection-increasing coating that follows a course of the relief,
   the higher-lying relief structure displaying a first optically variable effect in a first color,
   the lower-lying relief structure being visible through the reflection-increasing coating of the higher-lying relief structure, or through grid spaces or gaps in the reflection-increasing coating of the higher-lying relief structure, and displaying a second optically variable effect in a second, different color, and the security element being furnished in an interior layer, which is provided contiguously or in some regions, with at least one machine-readable feature substance; wherein the security element further includes an authenticating feature having two or more different machine-readable feature substances provided as planar layers of the security element.

2. The security element according to claim 1, wherein at least one machine-readable feature substance is integrated in a layer structure that produces the at least two appearances.

3. The security element according to claim 1, wherein the reflection-increasing coating of the higher-lying and/or the lower-lying relief structure includes, contiguously or in some regions, at least one machine-readable feature substance.

4. The security element according to claim 1, wherein the higher-lying relief structure is formed by an embossing lacquer layer whose embossing lacquer includes at least one machine-readable feature substance and/or in that the lower-lying relief structure is formed by an embossing lacquer layer whose embossing lacquer includes at least one machine-readable feature substance.

5. The security element according to claim 1, wherein the at least one machine-readable feature substance forms a code that indicates a currency, a series, a denomination and/or a lot of the security element.

6. The security element according to claim 1, wherein the machine-readable feature substances comprise IR-absorbing, IR-transparent, magnetic, electrically conductive and/or luminescent, including phosphorescent, feature substances.

7. The security element according to claim 1, wherein the security element includes an authenticating feature having two or more different machine-readable feature substances, including an authenticating feature having two or more IR-absorbing feature substances that absorb in different IR wavelength regions, an authenticating feature having two or more magnetic feature substances having different magnetic properties, including different coercivities, or an authenticating feature having two or more luminescent feature substances that luminesce with different emission spectra, or are excitable at different wavelengths.

8. The security element according to claim 7, wherein the two or more different feature substances are provided next to one another, one on top of another, adjoining one another or overlapping in different sub-regions.

9. The security element according to claim 1, wherein at least one machine-readable feature substance is present in a printing ink.

10. The security element according to claim 1, wherein at least one machine-readable feature substance is present in a vapor-deposited layer.

11. The security element according to claim 1, wherein the higher-lying relief structure and/or the lower-lying relief structure are formed by micromirror arrangements having directionally reflective micromirrors, including having non-diffractively behaving mirrors, and having flat mirrors, concave mirrors and/or Fresnel mirrors.

12. The security element according to claim 1, wherein the higher-lying relief structure displays a first optically variable effect in a first color, and the lower-lying relief structure displays, in free regions of the areal region, a second optically variable effect in a second, different color.

13. The security element according to claim 1, wherein at least one of the reflection-increasing coating of the higher-lying relief structure and the lower-lying relief structure is formed by a reflective color coating.

14. The security element according to claim 1, wherein the reflection-increasing coating of the higher-lying relief structure is formed, at least in a sub-region of the areal region, as a grid having grid elements and grid spaces, dimensions of the grid elements and grid spaces being, in one or more lateral directions, below 140 μm.

15. The security element according to claim 1, wherein the reflection-increasing coating of the higher-lying relief structure is formed, at least in a sub-region of the areal region, as an effect region in which lacquer regions and/or free regions have lateral dimensions of more than 140 μm.

16. The security element according to claim 1, wherein negative markings are formed in the security element by gaps in the reflection-increasing coating of the lower-lying relief structure.

17. A data carrier having an optically variable security element according to claim 1.

18. An optically variable security element for securing valuable articles, whose areal expanse defines a z-axis perpendicular thereto, having a reflective areal region that displays at least two appearances that are perceptible from different viewing directions,
    the reflective areal region including two relief structures that are arranged at different height levels in a z-direction and form a lower-lying and a higher-lying relief structure, each of which is furnished with a reflection-increasing coating that follows a course of the relief,
    the higher-lying relief structure displaying a first optically variable effect in a first color,
    the lower-lying relief structure being visible through the reflection-increasing coating of the higher-lying relief structure, or through grid spaces or gaps in the reflection-increasing coating of the higher-lying relief structure, and displaying a second optically variable effect in a second, different color, and
    the security element being furnished in an interior layer, which is provided contiguously or in some regions, with at least one machine-readable feature substance;
    wherein the higher-lying relief structure is formed by an embossing lacquer layer whose embossing lacquer includes at least one machine-readable feature substance therein and/or in that the lower-lying relief structure is formed by an embossing lacquer layer whose embossing lacquer includes at least one machine-readable feature substance therein, the at least one machine-readable feature substance comprising an IR-absorbing, IR-transparent, magnetic, electrically conductive and/or luminescent feature substance.

19. An optically variable security element for securing valuable articles, whose areal expanse defines a z-axis perpendicular thereto, having a reflective areal region that displays at least two appearances that are perceptible from different viewing directions,
    the reflective areal region including two relief structures that are arranged at different height levels in a z-direction and form a lower-lying and a higher-lying relief structure, each of which is furnished with a reflection-increasing coating that follows a course of the relief,
    the higher-lying relief structure displaying a first optically variable effect in a first color,
    the lower-lying relief structure being visible through the reflection-increasing coating of the higher-lying relief structure, or through grid spaces or gaps in the reflection-increasing coating of the higher-lying relief structure, and displaying a second optically variable effect in a second, different color, and the security element being furnished in an interior layer, which is provided contiguously or in some regions, with at least one machine-readable feature substance;

wherein the at least one machine-readable feature substance forms a code that indicates a currency, a series, a denomination and/or a lot of the security element.

20. An optically variable security element for securing valuable articles, whose areal expanse defines a z-axis perpendicular thereto, having a reflective areal region that displays at least two appearances that are perceptible from different viewing directions, the reflective areal region including two relief structures that are arranged at different height levels in a z-direction and form a lower-lying and a higher-lying relief structure, each of which is furnished with a reflection-increasing coating that follows a course of the relief, the higher-lying relief structure displaying a first optically variable effect in a first color, the lower-lying relief structure being visible through the reflection-increasing coating of the higher-lying relief structure, or through grid spaces or gaps in the reflection-increasing coating of the higher-lying relief structure, and displaying a second optically variable effect in a second, different color, and the security element being furnished in an interior layer, which is provided contiguously or in some regions, with at least one machine-readable feature substance;

wherein the at least one machine-readable feature substance is present in a vapor-deposited layer.

* * * * *